April 7, 1936.    R. L. CLARK    2,036,515
PRISON BUILDING
Filed Aug. 21, 1930    10 Sheets-Sheet 3
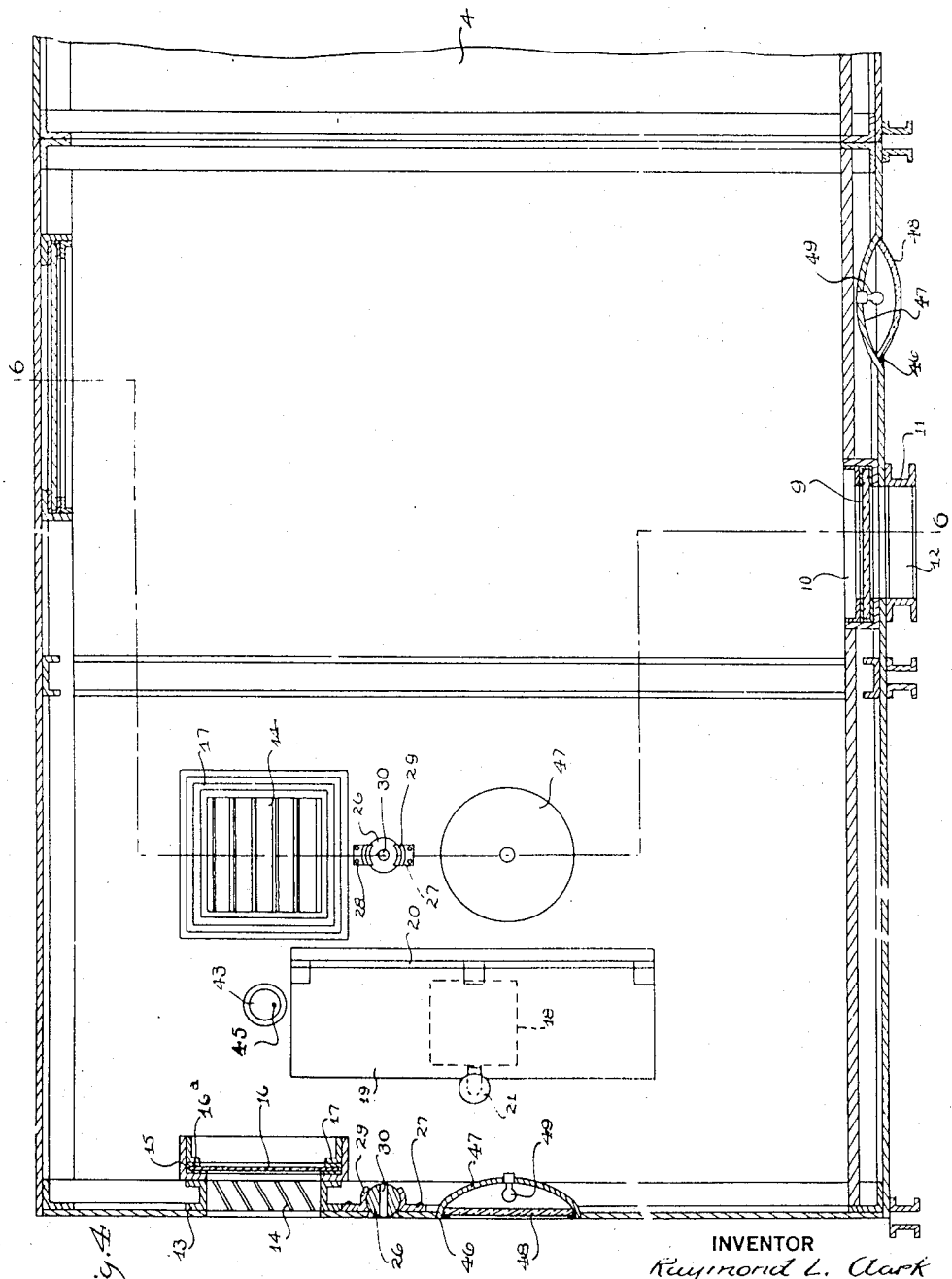
INVENTOR
Raymond L. Clark
BY
his ATTORNEY April 7, 1936.  R. L. CLARK  2,036,515
PRISON BUILDING
Filed Aug. 21, 1930  10 Sheets-Sheet 4
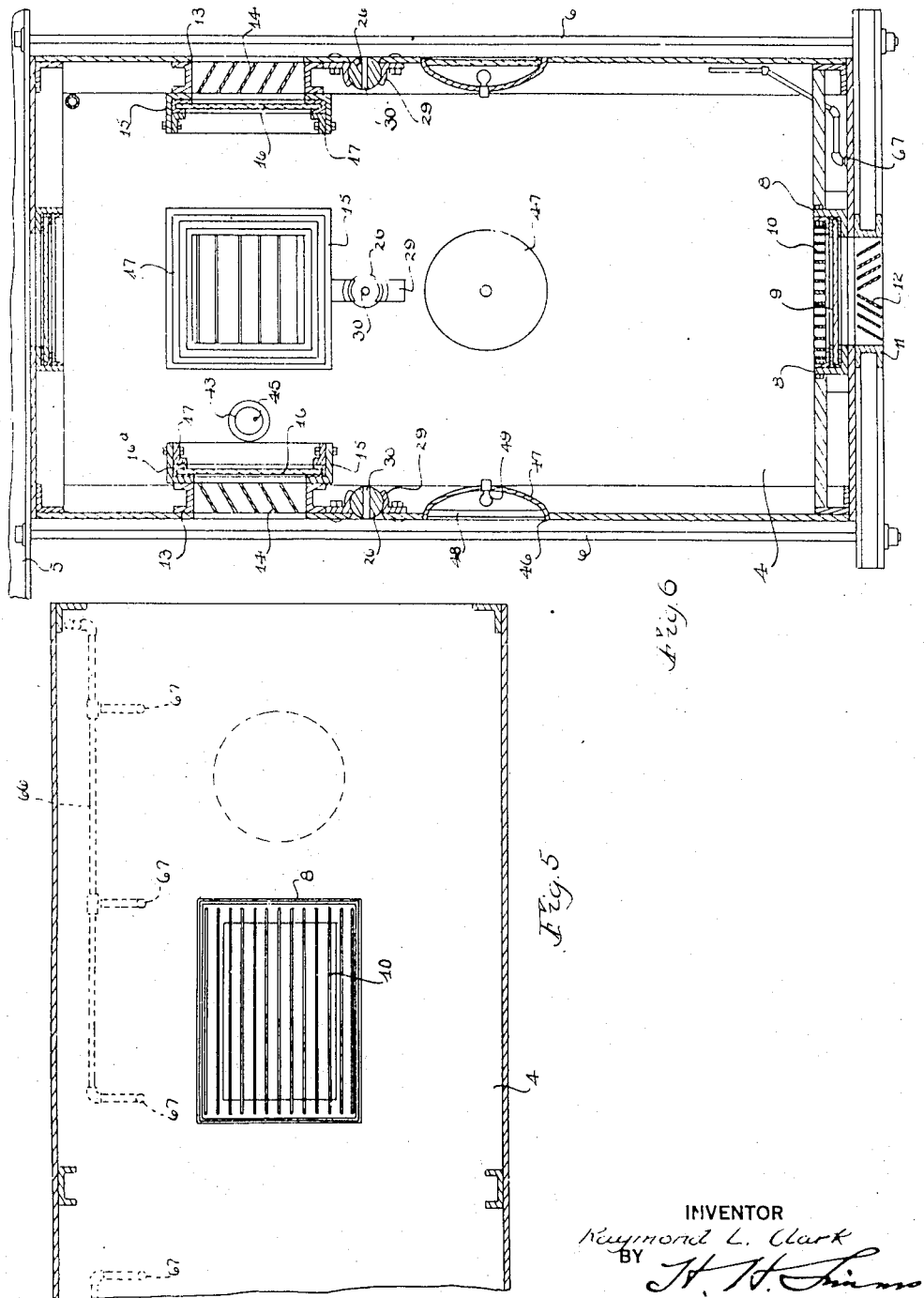
INVENTOR
Raymond L. Clark
BY
His ATTORNEY

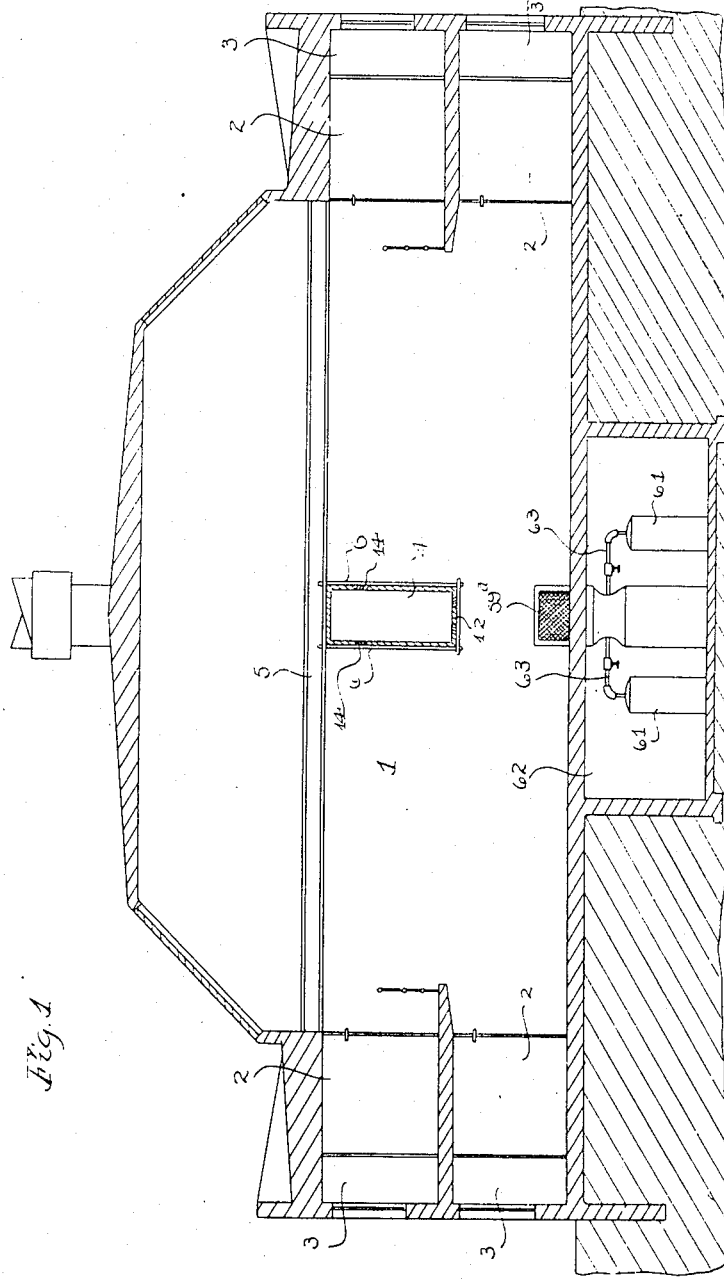

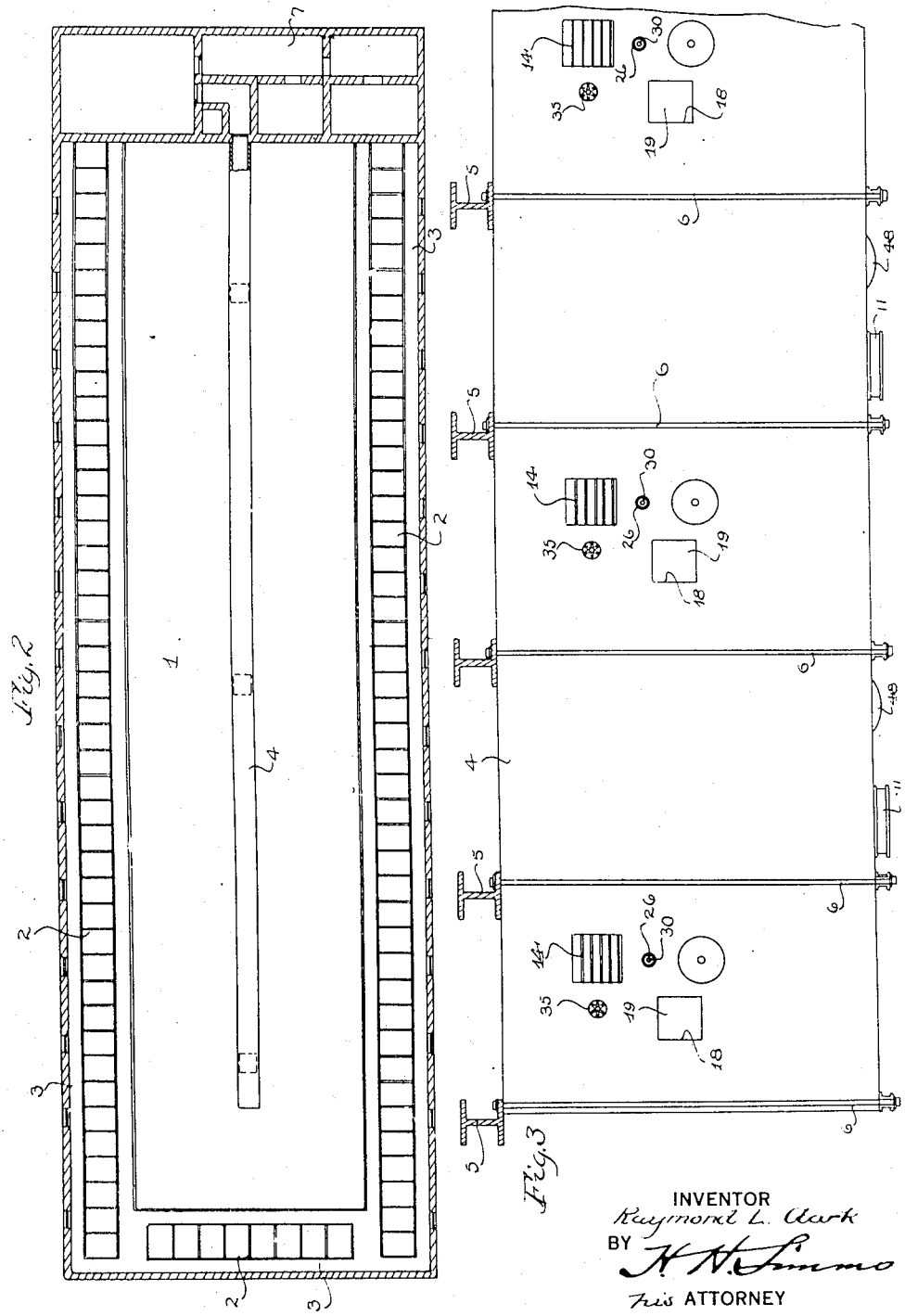

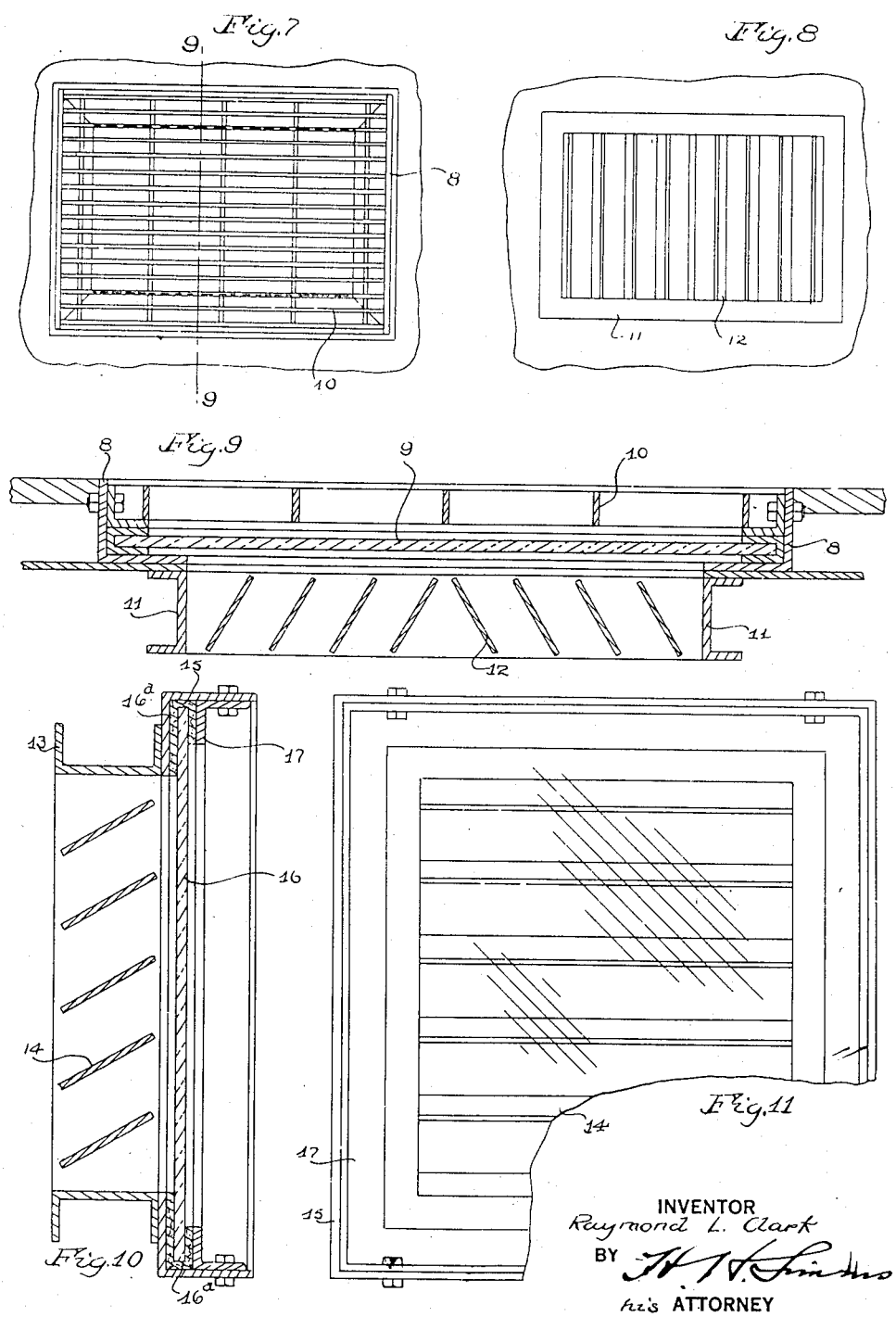

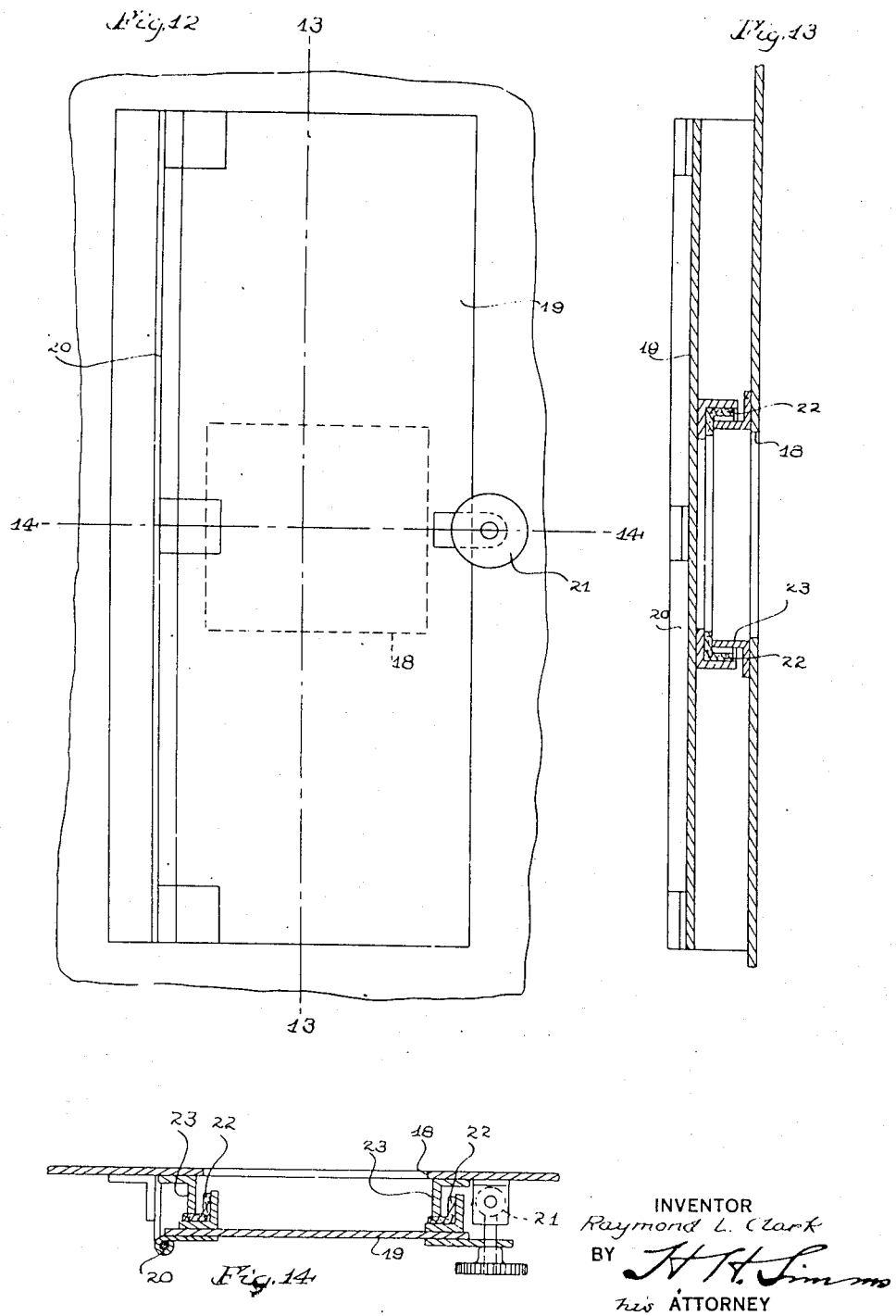

April 7, 1936.  R. L. CLARK  2,036,515
PRISON BUILDING.
Filed Aug. 21, 1930  10 Sheets-Sheet 7
Fig. 15
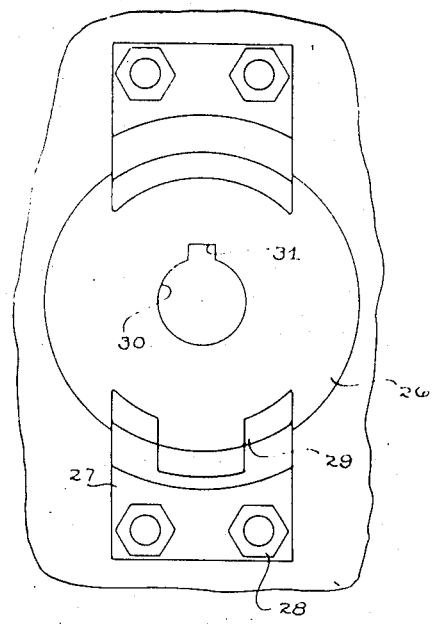
Fig. 16
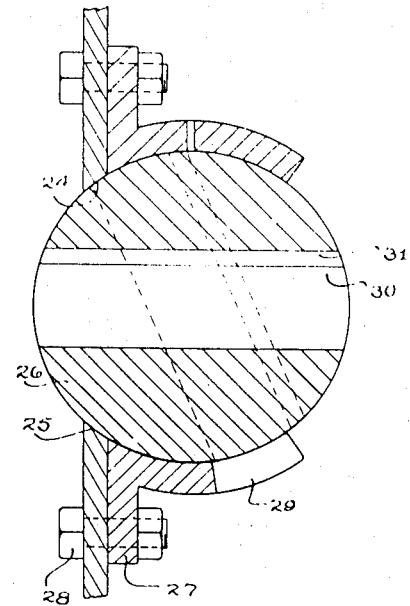
Fig. 18
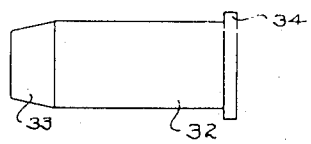
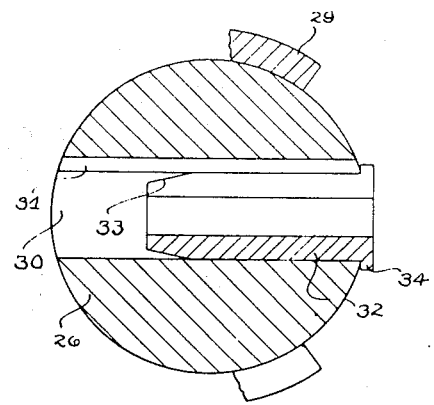
Fig. 17
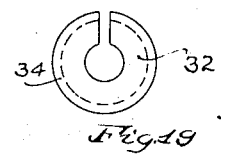
Fig. 19
INVENTOR
Raymond L. Clark
BY
His ATTORNEY April 7, 1936.                R. L. CLARK                2,036,515
                              PRISON BUILDING
                         Filed Aug. 21, 1930        10 Sheets-Sheet 3
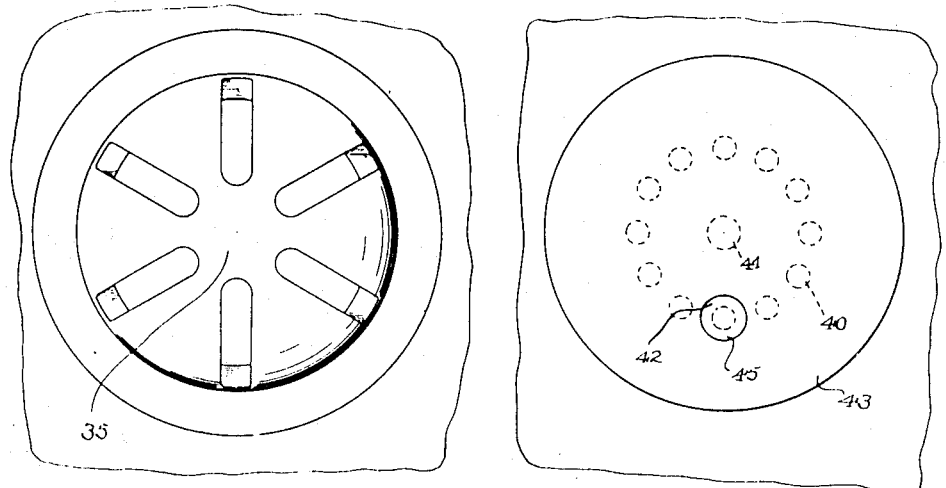
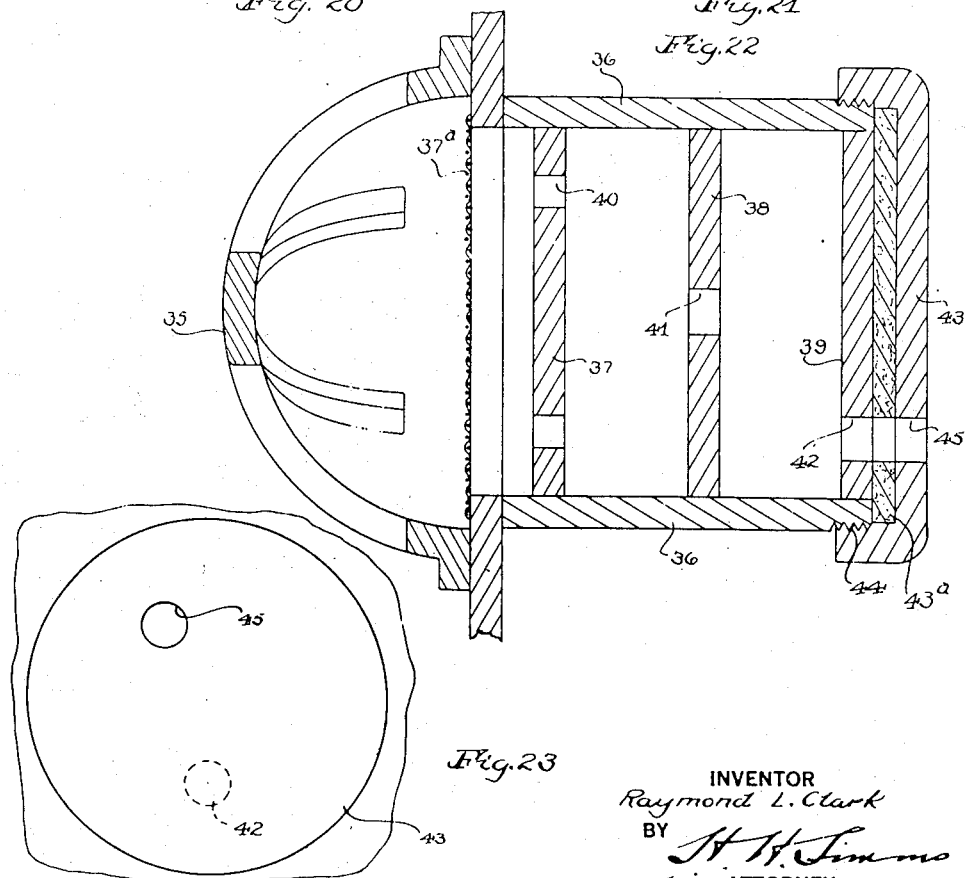
INVENTOR
Raymond L. Clark
BY
H. H. Simms
his ATTORNEY

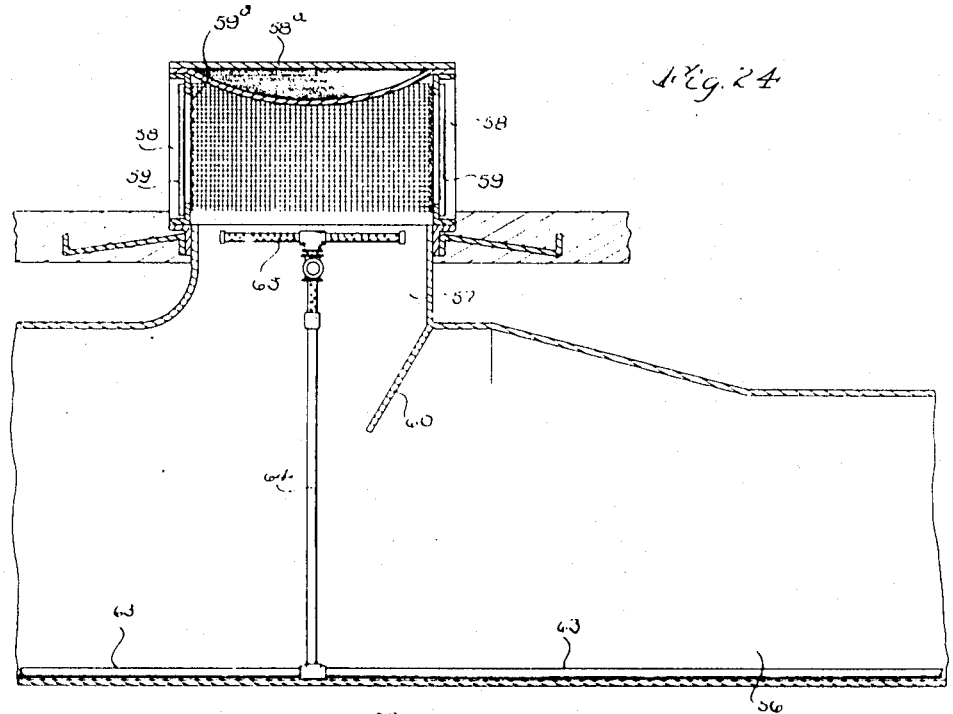

April 7, 1936.  R. L. CLARK  2,036,515
PRISON BUILDING
Filed Aug. 21, 1930  10 Sheets-Sheet 10
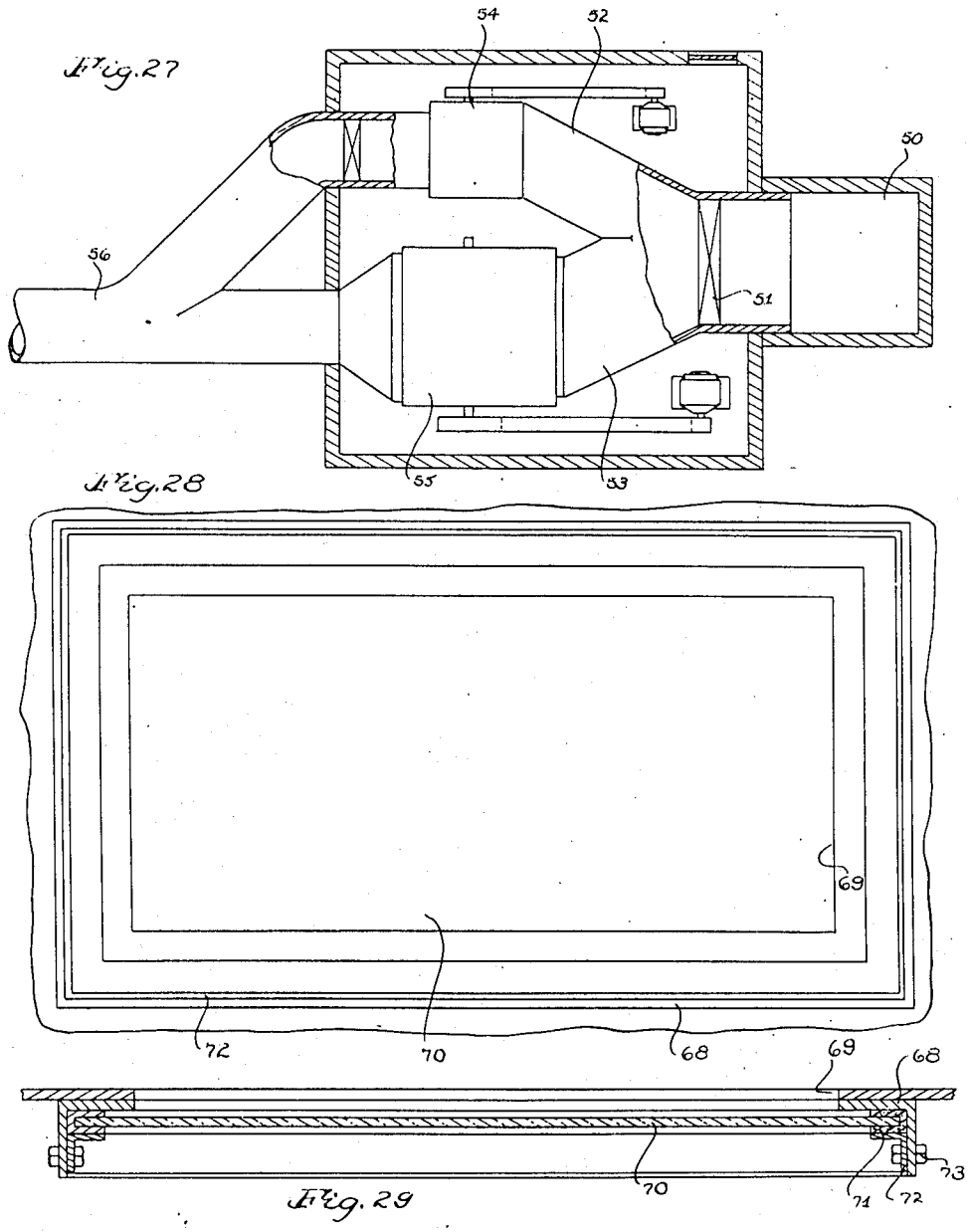
INVENTOR
Raymond L. Clark
BY H. H. Simms
His ATTORNEY Patented Apr. 7, 1936

2,036,515

UNITED STATES PATENT OFFICE 2,036,515

PRISON BUILDING

Raymond L. Clark, Rochester, N. Y., assignor, by mesne assignments, to Armorite Equipment Incorporated, Rochester, N. Y., a corporation of New York Application August 21, 1930, Serial No. 476,781

5 Claims. (Cl. 189—5)

The present invention relates to prison buildings and an object thereof is to provide a construction which will give to the guards an efficient observation and control of the prisoners at all times. Another object of the invention is to provide a novel observation corridor from which a smaller number of guards may without danger to themselves observe all of the prisoners in the prison and hold such prisoners under control. Still another object of the invention is to provide a novel heating and/or ventilating system for the building which may be used for gassing the prisoners without danger to the guards. Other objects of the invention are to provide in connection with an observation compartment provision for viewing the prisons, illuminating the prisons, projecting gas bombs, listening in on the conversation of the prisoners and for firing upon the prisoners, all without danger to the guards.

To these and other ends, the invention consists of certain parts and combinations of parts all of which will be hereinafter described: the novel features being pointed out in the appended claims.

In the drawings:

Fig. 1 is a vertical section through a prison building embodying the present invention;

Fig. 2 is a horizontal section through the same building;

Fig. 3 is an enlarged fragmentary side view of the observation corridor;

Fig. 4 is a vertical longitudinal section through the observation corridor;

Fig. 5 is a plan view of a fragment of the floor of the observation corridor;

Fig. 6 is a section on the line 6—6, Fig. 4;

Figs. 7 and 8 are respectively inner and outer face views of a floor louvre;

Fig. 9 is a section on the line 9—9, Fig. 7;

Figs. 10 and 11 are respectively a vertical section and inner face view of one of the wall louvres;

Figs. 12, 13 and 14 are respectively a plan of the gas bomb outlet and closure, a section on the line 13—13, Fig. 12, and a section on the line 14—14, Fig. 12;

Figs. 15 and 16 are respectively an inside and vertical section of the fixture through which fire arms are projected;

Fig. 17 is a section showing a revolver adapter fitted in the fixture shown in Figs. 15 and 16;

Figs. 18 and 19 are respectively a side and an end view of the revolver adapter;

Figs. 20 and 21 are respectively an outside and an inside face view of a listening device;

Fig. 22 is a vertical longitudinal section through the listening device;

Fig. 23 is a view similar to Fig. 21 showing the listening device shut off;

Fig. 24 is a vertical section of a portion of the combined heating, ventilating and gassing system;

Fig. 25 is a horizontal section through the outlet head of the combined system;

Fig. 26 is a fragmentary view of the outlet head;

Fig. 27 is a plan view with parts broken away of another portion of the combined heating, ventilating and gassing system; and Figs. 28 and 29 are respectively an outer face and vertical longitudinal section of the skylight.

In the illustrated embodiment of the invention, the building has a main room 1 along three sides of which are arranged the cells 2 preferably in two floors separated from the outside walls of the building by corridors 3. All of the cells open into the room 1 and as is common are separated from the main room only by bars or grille work so that the interiors of the cells may be seen from the main room 1.

Within the main room is an observation corridor 4. In this instance, the walls of the corridor are preferably made of bullet-proof material such as sheet steel or reinforced concrete and the bottom of this corridor is arranged above the floor of the main room 1 high enough for a person to pass beneath the same in an upright position. It is preferred to suspend the corridor from the transversed beams 5 of the trussed roof, sidewalls or partitions of the building by hanger rods 6, and to connect the corridor at one end to one end of the building in which the headquarters 7 of the guards is arranged, the other end of the corridor being spaced from the opposite end of the building where cells are provided.

The bottom of the observation corridor is provided with view openings each of which, in this instance, embodies a frame 8 set in an opening in the floor and formed of angle iron side pieces, the inwardly turned flanges at the bottom of the frame serving as a rest for bullet-proof glass plates 9. Above the glass plate and flush at its upper face with the floor and upper edge of the frame 8 is a floor grille 10 serving to protect the glass from the feet of the occupants of the corridor. Projecting from the bottom of the corridor about the view opening is another frame 11 formed of channel iron and receiving within them louvre slats 12. Through the slats the guards may look without being seen as the corridor is dark and the room 1 is light. The louvre also protects the glass plate from blows.

The vertical side walls and end wall may have view openings each of which may be surrounded by a frame 13 secured to the vertical wall and formed of channel pieces enclosing louvre slats 14. Secured to the frame 13 is a frame 15 formed of angle iron pieces and providing a seat for a bullet-proof sheet of glass 16 which is held in position by a frame 17 received within the frame 15. A packing 16ª serves to render the joint about the glass gas proof. Openings 18 may be provided in the corridor through which gas bombs may be thrown. A novel closure 19 is provided for such openings to protect the guard against shots from the prison while throwing the bomb. This closure is hinged at 20 to one side of the opening. It is made of bullet-proof metal and is vertically elongated to extend a considerable distance above and below the opening so that shots cannot reach the body of a guard standing behind it and using one arm to throw the bomb around one side of the door through the opening 18. It is preferred to situate a view opening adjacent to the hinged side of the closure for the bomb opening in order that the guard may be able to direct the bomb to the most effective position. A locking device 21 of any suitable construction may secure the swinging side of the door on the inside of the corridor, and a gasproof packing 22 may be carried by the door to cooperate with a flange 23 surrounding the opening 18.

The corridor may be equipped with openings for fire arms preferably directly beneath the side view openings (see Figs. 15 to 19 inclusive). Preferably the steel walls of the corridor have openings 24 each of which has a seat 25 on its inner face for a sphere or ball 26 which may be held to the seats by plates 27 bolted at 28 to the side wall and provided with curved annular seats 29. The sphere or ball may have a diametrically arranged bore 30 formed with a longitudinal groove 31. The barrel of the rifle or gun is passed through the bore 30, the front sight travelling in the groove 31. When these balls are not being used they may be turned to the position indicated in dotted lines on Fig. 16 so that the openings for the fire arms are closed. An adapter may be used in connection with each ball to permit the use of pistols or revolvers. This adapter, in this instance, is in the form of a split sleeve 32 tapered at 33 to facilitate its introduction into the bore of the sphere and having a flange 34 at one end to limit its movement in the bore in one direction. The split serves as a way in which the front sight on the pistol or revolver may move through the sleeve. When either a pistol or a rifle or gun is extended through the sphere it may be readily aimed in any direction due to the universal movement of the sphere in the wall of the corridor, the window of the corridor being used to direct the fire arms.

With the end in view of "listening-in" on the prisoners, listening devices may be provided each comprising an opening in the wall of the corridor having a protecting cage 35 in front thereof (see Figs. 20 to 23 inclusive). A short tube 36 is welded to the inner face of the wall about the opening and encloses a plurality of spaced disks 37, 38 and 39. The disk 37 has an annular series of openings 40, and is covered by a protecting screen 37ª. The disk 38 has a central opening 41 and the disk 39 at the inner end of the tube has an eccentric opening 42. Arranged to turn in close proximity to the disk 39 is a shutter 43 in the form of a cap internally threaded and engaging external threads 44 on the inner end of the tube. A gas-proof disk 43ª is arranged between the shutter 43 and the disk 39. By turning the shutter 43, the eccentric opening 45 therein may be thrown into and out of alinement with the opening 42 in order to open or close the listening device.

For illuminating the prison from the observation corridor, the latter may have its side and bottom walls provided with illuminating devices constructed, in this instance, by providing in the steel walls of the corridor openings 46 in which are fitted concavo convex steel disks 47, the concave faces of which are silvered or coated with a reflecting material. A disk of bullet-proof glass 48 closes the concave face of each disk 47 and encloses an electric bulb 49 which may be controlled from the interior of the corridor in any suitable manner.

Associated with the building is a combined heating, ventilating and gassing system. This system, in this instance, comprises an intake 50 for outside or fresh air leading to a heater 51 from which leads two conduits 52 and 53, one smaller than the other. Blowers 54 and 55 are arranged respectively in the conduits 52 and 53, the former having less capacity than the other and serving for the normal ventilation and heating of the prison. Where it is desired to feed an excess of air to the prison, the larger blower is brought into use as when the system is used for gassing prisoners or clearing the prison of gas. From the two blowers a conduit 56 may lead to any part of the prison. This conduit preferably contains outlets 57 through the flooring of the building, and these outlets may be covered by a register comprising, in this instance, a projecting metal frame 58 with a closed top 58ª and open sides formed by vertical parallel bars 59 on the inner sides of which is a wire mesh 59ª to prevent trash being thrown into the conduit. A flange or trapping lip 60 depends from the top wall of the conduit adjacent that side of the outlet 57 opposite the side at which the gas or air passes to the outlet so as to deflect a portion of the air or gas through the outlet.

With the purpose in view of supplying a stupifying gas to the prison, gas tanks 61 may be provided, as for instance, in a basement or cellar 62 in the prison and pipes 63 may connect therewith and with stand pipes 64 which project into the outlets 57 and have gas distributing heads 65 at their upper ends situated at the bottom of the registers so that the gas issuing from said heads will be blown through the registers and into the prison. The pipe 63 may also connect with a line pipe 66 leading through the observation corridor and provided with outlet nozzles 67 which discharge through the bottom of the corridor into the prison room 1.

If desired the top of the corridor may be provided with skylights each comprising, in this instance, (see Figs. 28 and 29) a frame 68 formed of angle iron side pieces and secured about an opening 69 in the top wall of the corridor. A sheet 70 of bullet-proof glass has a gas tight fit 71 with the frame 68 and is held therein by a frame 72 formed of angle iron side pieces and secured in position by bolts 73.

In this embodiment of the invention an observation corridor is provided in the form of a suspended gallery positioned with reference to a series of cells so that the cells and the prisoners therein may be observed without the prisoners being aware of the fact. The gallery is made of bullet-proof material and is provided with lookout or view openings at desirable points protected by steel louvres and bullet-proof glass. The observation gallery or corridor has listening devices suitably distributed which are protected against bullets or tampering and suitably protected illuminating devices are provided for flooding the cells with light. Provision is made through suitable devices whereby fire arms may be fired from the corridor without danger to the guards and through openings which may be controlled only from the inner side of the corridor.

The heating and ventilating of the lookout or observation gallery or corridor is independent of the cells and the main prison room, and the heating and ventilating system of the cells is also used as a gassing system for the prisoners as well as for clearing the prison cells and main room of gas after a gassing operation, as the opening of the gas plant to the heating and ventilating system fills the prison cells and main room with gas and the closing of the gas supply permits the ventilating system to clear the cells and main room in a short time, there being an air outlet at the top of the main room which is closed during a gassing operation and opened after the gassing. The lookout gallery or corridor is fully gas-proof so that the occupants are protected while the prisoners are being gassed.

What I claim as my invention and desire to secure by Letters Patent is:

1. The combination with a wall having an opening through which a bomb may be thrown, of a bullet-proof closure for the opening hinged at one vertical side of the opening and projecting considerably above and below the opening so as to provide protecting portions so that shots cannot reach the body of the person standing behind the closure when in the act of throwing a bomb through said opening.

2. The combination with a prison comprising a series of rooms and cells arranged along the sides thereof, of an observation corridor common to the rooms having its walls exposed to the cells gas-proof, of a forced air conduit discharging into the rooms through a suitable outlet, and a gassing system arranged in the conduit to discharge through the outlet, a deflector in the conduit for deflecting air from the conduit through the outlet into the rooms.

3. The combination with a wall having an opening through which a bomb may be thrown and provided with a marginal inwardly directed flange, of a bullet-proof closure for the opening hinged at one inner vertical side of the opening and projecting substantially above and below the opening so as to provide protecting portions for the protection of the full figure of a person against bullets, when the closure is moved to uncover the opening, said closure having flanges adapted to embrace the marginal flange of said opening when the door is closed.

4. The combination with a wall having an opening through which a bomb may be thrown and provided with a marginal inwardly directed flange, of a bullet-proof closure for the opening hinged at one inner vertical side of the opening and projecting substantially above and below the opening so as to provide protecting portions for the protection of the full figure of a person against bullets, when the closure is moved to uncover the opening, said closure having flanges adapted to embrace the marginal flange of said opening, and a gas-proof packing carried by the door within the inwardly directed flange of the door to coact with the latter and the marginal flange of the opening when the door is closed.

5. A prison observation corridor having its walls provided with openings through which gas and other bombs may be thrown from the interior of the corridor, a bullet-proof member normally forming a gas-proof closure for each wall opening, said member being in the nature of a door of substantially greater vertical and lateral dimensions than the opening, hingedly connected to the inner surface of the wall at one side of the opening to swing horizontally inwardly to open position and when in such position form a bullet-proof protection for the full figure of a person engaged in throwing a bomb from the free edge of the door through said opening, said door and the wall around the opening having cooperating means to secure the door in closed position across the opening and seal the space between the door and the wall.

RAYMOND L. CLARK.